June 15, 1965  D. F. THOMAS ETAL  3,189,149
ELECTRIC SHIFT FOR CLUTCH
Filed Aug. 11, 1961  3 Sheets-Sheet 2

INVENTOR
DAVID F. THOMAS
ROBERT A. HILL
BY Robert M. Dunning
ATTORNEY

INVENTOR
DAVID F. THOMAS
ROBERT A. HILL
BY Robert M. Dunning
ATTORNEY

United States Patent Office 3,189,149
Patented June 15, 1965

3,189,149
ELECTRIC SHIFT FOR CLUTCH
David F. Thomas, St. Paul, and Robert A. Hill, Minneapolis, Minn., assignors to Waterous Company, Ramsey County, Minn., a corporation of Minnesota
Filed Aug. 11, 1961, Ser. No. 131,011
9 Claims. (Cl. 192—82)

This invention relates to an improvement in the electric shift units for use upon centrifugal pumps and deals particularly with an apparatus for disengaging the drive shaft of a fire truck from the propeller shaft of the vehicle and connecting the drive shaft to the drive gears of the centrifugal pump to operate the same.

For some years it has been common practice to provide a clutch on the drive shaft leading from the engine of a fire truck to selectively connect the drive shaft either with the propeller shaft of the vehicle or with the drive gears of the centrifugal pump. This clutch has usually been manually operated and must either include a series of links and levers connected to the clutch shifting fork and leading to a point near the driver's seat of the vehicle, or else must be operated manually from a point adjoining the clutch. Where the clutch is operated by remote control, there is always a possibility of mechanical failure. Where the clutch is operated manually from a point adjacent the clutch, it is usually necessary that the operator be located at this point in order to accomplish the necessary results. Thus, while the last system is somewhat more dependable, it usually requires an extra operator to accomplish the task.

It is an object of the present invention to provide an electrically operated shifting mechanism which is capable of shifting the clutch from one position to the other. This clutch mechanism may be operated by a push button or other switch located conveniently to the operator so that the speed of operation of the vehicle motor and the shifting operation of the clutch may be readily synchronized by a single operator and the necessity of a mechanical clutch operating means, and the necessity of providing a separate operator for shifting the clutch, may be eliminated.

A feature of the present invention resides in the provision of an electrically operated shift mechanism which may be quickly and easily operated manually in the event of power failure or in the event of mechanical failure of the shifting unit. Means are provided to quickly and readily disengage the shifting unit from the shifting fork in the event of such emergency. A manually operable lever is connected to the shifting fork and may be operated to manually shift the clutch.

These and other objects and novel features of the present invention will be more clearly and fully set forth in the following specification and claims.

In the drawings forming a part of the specification:

FIGURE 7 is an exploded perspective view of a portion of the gear shifting unit detached from the remainder of the structure.

Figure 1:
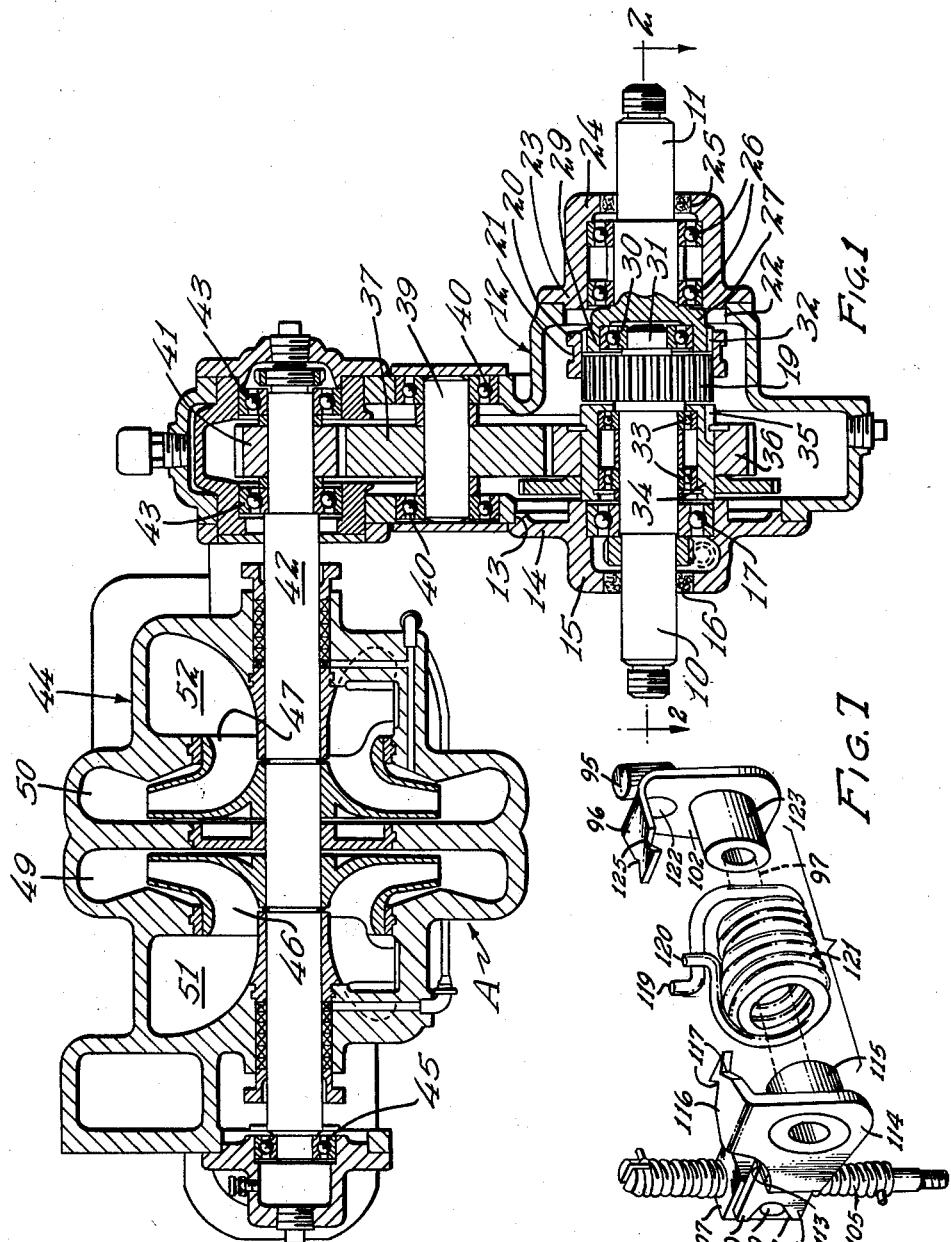
FIGURE 1 is a vertical sectional view through a centrifugal fire pump and through the gear housing showing the general arrangement of parts therein.

In general, the centrifugal pump A is of the type normally mounted on fire trucks and the like and is of the type described in an application for patent filed in the names of David F. Thomas and Robert A. Hill, Serial No. 731,387, now Patent No. 2,988,189, for Electro-Matic Shift for Fire Pumps. The pump A is driven by drive shaft 10 which is connected by suitable means to the vehicle engine. A driven shaft 11 is aligned with the drive shaft 10 and may be connected thereto by a clutch which will be described. The driven shaft 11 is connected to the propeller shaft or in a suitable way to the vehicle differential to drive through this differential to the vehicle drive wheels.

The shafts 10 and 11 are rotatably supported in the gear housing which is indicated in general by the numeral 12. The housing 12 is provided on one side with an opening 13 normally closed by a cover plate 14 having a cup shaped projection 15 provided with an axial aperture 16 through which the shaft 10 extends. A bearing 17 extends between the cover plate 14 and the shaft 10 to support the shaft. The drive shaft 10 is provided near its inner extremity with an enlarged diameter portion 19 which is externally toothed or splined to slidably support a shifting collar 20. The collar 20 is externally grooved as indicated at 21 to accommodate the shifting fork which will be later described. The collar 20 is movable axially on the shaft 10.

The gear housing 12 is provided with a second aperture 22 through the side of the housing opposite that having the aperture 13. This second aperture 22 is in axial alignment with the aperture 13 and is normally closed by a closure plate 23 having a cup shaped projection 24 provided with an axial aperture 25 therein. Spaced bearings 26 are provided within the cup shaped projection 24 to support the shaft 11 in axial alignment with the shaft 10. The shaft 11 is provided with a flange 27 at its inner end which supports the hollow sleeve 29 projecting beyond the inner end of the shaft 10. The sleeve 29 accommodates a bearing 30 which is interposed between the sleeve and the small diameter inner extremity 31 of the shaft 10 so as to hold the two shafts in alignment. The sleeve 29 is externally toothed or splined as indicated at 32 to accommodate the internal splines on the shift collar 20. When the shifting collar 20 is in the position shown in FIGURE 1 of the drawings and overlaps a part of the externally splined portion 19 of the shaft 10 and also the splined portion 32 of the sleeve 29, the driven shaft 11 will rotate with the drive shaft 10 so that the vehicle engine will operate to drive the vehicle wheels.

The drive shaft 10 is encircled by a pair of bearings 33 which support a concentric sleeve 34 in shaft encircling position. The end of the sleeve adjoining the drive shaft enlargement 19 is externally splined as indicated at 35 and this sleeve is of the same external diameter as the shaft enlargement 19 so as to accommodate internal splines of the shifting collar 20. Thus when the collar is moved to the left from the position shown in FIGURE 1, this collar may simultaneously engage the splines of the shaft enlargement 19 and the splines 35 of the sleeve 34 to rotate this sleeve in unison with the drive shaft.

The sleeve 34 is keyed or otherwise secured to a drive gar 36 which meshes with an idler gear 37 mounted on a counter shaft 39 supported by bearings 40 mounted in gear housing 12. The idler gear 37 is in turn in mesh with a gear 41 mounted upon the pump impeller shaft 42. Bearings 43 mounted in the gear housing 12 support an end of the impeller shaft 42, the shaft extending laterally from the gear housing and into the pump housing 44.

The details of construction of the centrifugal pump are not of importance in the present application. The pump housing 44 is secured in fixed relation to the gear housing 12 and includes a bearing 45 supporting the end of the impeller shaft 42 opposite the ends supported by the bearings 43. Impellers 46 and 47 are mounted upon the impeller shaft 42 to rotate therewith within the impeller chambers or volutes 49 and 50 respectively. Intake manifolds 51 and 52 are in communication with the inlet ends of the impellers 46 and 47 and the volutes 49 and 50 are connected to a discharge manifold in a suitable manner, not illustrated in the drawings.

Figure 2:
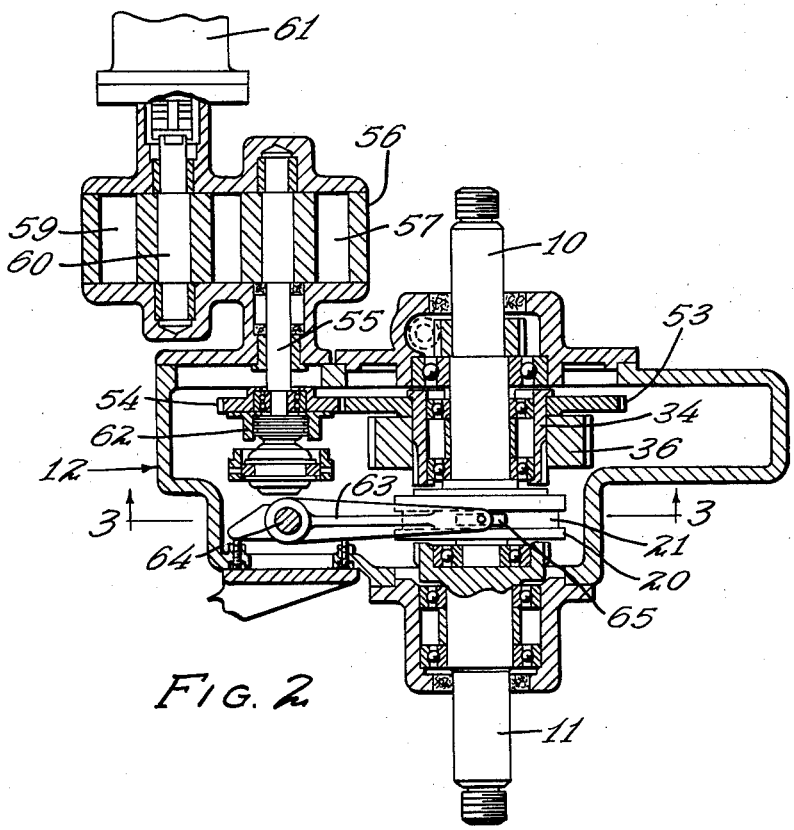
FIGURE 2 is a horizontal sectional view taken on the line 2—2 of FIGURE 1 through the lower portion of the gear housing showing the general arrangement of the shifting mechanism.
Figure 3:
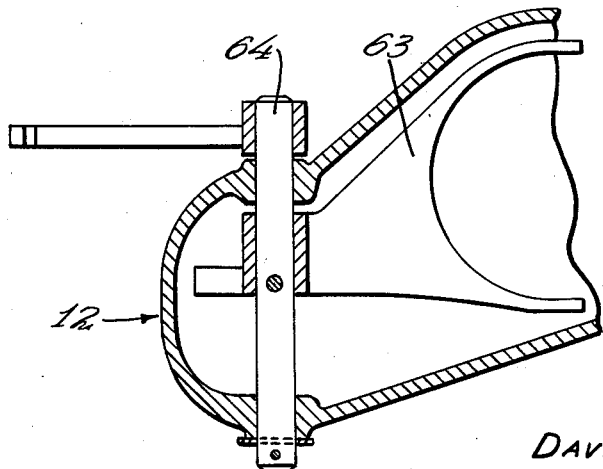
FIGURE 3 is a vertical sectional view through the shifting fork, the position of the section being indicated by the line 3—3 of FIGURE 2.

With reference now to FIGURE 2 of the drawings, it will be noted that a second gear 53 is also mounted upon the sleeve 34, together with the gear 36. The gear 53 is in mesh with a cooperable gear 54 rotatably supported on a drive shaft 55 leading to a priming pump 56. The priming pump 56 is provided with rotors 57 and 59 mounted upon the shaft 55 and a parallel shaft 60 respectively. The form of the priming pump 56 is not of importance in the present invention, and this pump may be either driven by an electric motor 61 connected to the other shaft 60 or by the vehicle motor acting through the gears 53 and 54. A clutch 62 is provided for connecting the gear 54 for rotation with the shaft 55 when desired.

A shifting fork 63 is secured to a pivot shaft 64 supported by the gear housing 12 in a manner so that the rollers or shoes 65 may engage in the groove 21 of the shift collar 20 and so that the shifting fork may operate to slide the collar 20 longitudinally with respect to the drive shaft 10 and driven shaft 11.

Figure 4:
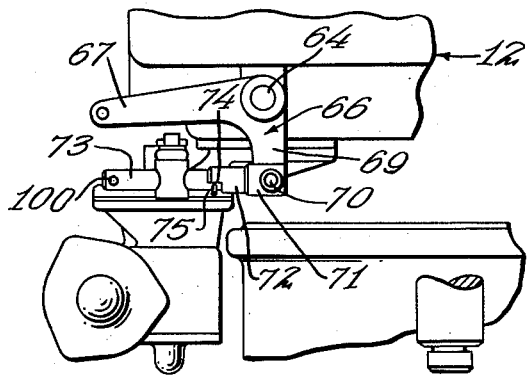
FIGURE 4 is a top plan view of the connection between the electrical operating unit and the shifting fork shaft.
Figure 5:
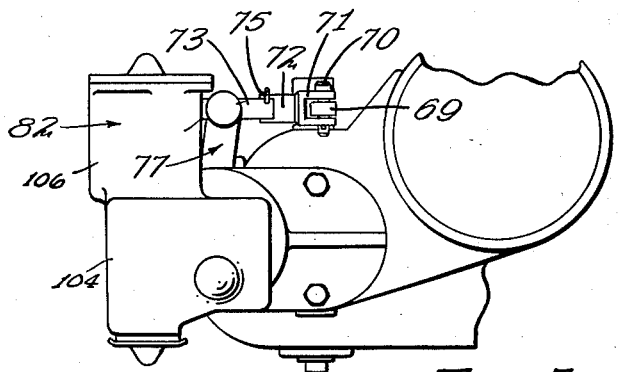
FIGURE 5 is an elevational view of the mechanism illustrated in FIGURE 4.
Figure 6:
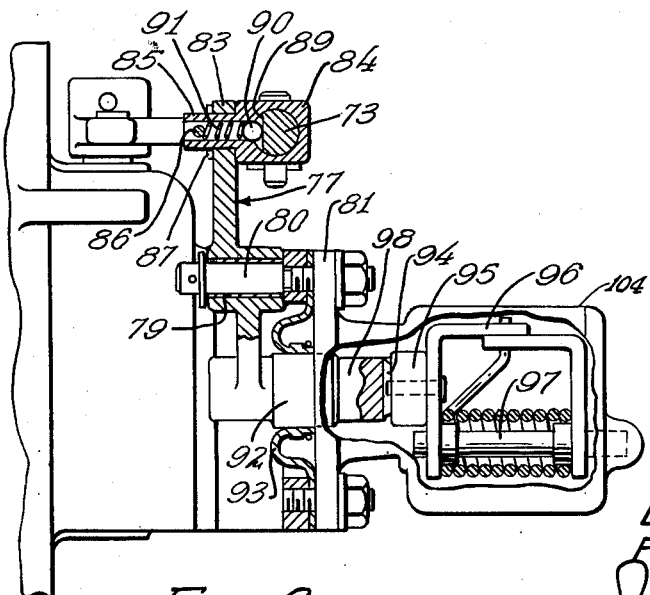
FIGURE 6 is an elevational view, partly in section, showing the connection between the electrical operating means and the shift lever, the view being taken at right angles to that of FIGURE 5.

With reference now to FIGURES 4, 5, and 6 of the drawings, externally of the housing 12 the shaft 64 is provided with a bell-crank lever 66 one end 67 of which serves merely as a means of operation of the shaft 64 in the event no other simple means is available. The arm 69 of the lever 66 is pivotally connected at 70 to a clevis 71 which includes an internally threaded socket indicated in general by the numeral 72. A rod 73 is threaded into the socket within the clevis end 72, and a portion of the end of the socket 72 is notched as indicated at 74 so that a pin 75 may be inserted into the rod 73 to limit pivotal movement of the rod relative to the clevis. The rod 73 is usually permitted to rotate 90 degrees within the socket 72.

A lever 77 is pivotally supported upon a bushing 79 encircling a fixed pivot 80 secured to a mounting flange 81 of an electrically operated shifting apparatus 82 which is similar to that disclosed in the previous application above referred to. The lever 77 includes an upper arm 83 which supports a swivel 84 having an aperture through which the rod 73 extends. The swivel 84 is supported by tubular arm 85 which extends through the upper end of the lever 83. A pin 86 and retaining washer 87 hold the swivel properly engaged upon the lever arm 83.

The rod 73 is provided with a straight sided notch 89 extending across the rod at one position in its length. A ball 90 is designed to engage in the notch 89, and is urged into engaging position by a spring 91. When the ball 90 is engaged in the notch 89, the rod 73 moves in unison with the lever arm 77. As a result, when the rod 73 is in the position illustrated in FIGURE 6 of the drawings, pivotal movement of the lever 77 will act through the rod 73 to pivot the lever 66, thereby pivoting the shaft 64 and the shift fork 63.

The lower end of the lever 77 includes a laterally extending arm 92 which extends through a flexible diaphragm 93 and into the electrical actuating unit 82. The end 98 of the arm 92 is bifurcated as indicated at 94 to accommodate an actuating bar 95 pivotally supported on a lever arm 96 forming a part of a lever 102 which is pivotally supported on a pivot 97. The sole purpose of the electrical unit 82 is to swing the lever 77 about its axis 80 from one extreme position to another, the lever 77 acting through the swivel 84 of the rod 73 to pivot the lever 66 and thereby to shift the shifting fork 63.

In any device of the type described, there is always a possibility of electrical failure, and there is also a possibility that the parts will become coated with ice so that the electrical unit is incapable of accomplishing the desired result. It is obvious that when the ball 90 is in engagement in the notch 89, the shaft 73 will move in conjunction with the lever 77. However, if the shaft 73 is rotated through a 90 degree angle, the ball 90 will ride on the surface of the shaft, and the rod 73 will be out of control of the lever 77.

With reference now to FIGURE 4 of the drawings, it will be noted that a pin 100 is provided on a projecting end of the rod 73. This pin 100 is engageable with a suitable wrench or tool to rotate the shaft 73 or rod at an angle of 90 degrees, at which time the bearing ball 90 will be in engagement with the peripheral surface of the rod 73. At this point, the rod 73 may be shifted forwardly or backwardly without any interference from the ball 90, and as a result, the pump can be operated independently of the electrical shift unit. In other words, by axial movement of the rod 73, the rod may be either engaged by the ball 90, and move with pivotal movement of the lever 77, or move independently thereof. As a result, the shift fork 63 may be operated either independently or by the electrical operation of the unit 82 depending upon the rotative position of the shaft 73.

The electrical actuator 82 which comprises the shifting unit is not shown in great detail. In general, the shifting unit 82 acts to pivot the actuator arm 92 about the axis of the lever 77 on which it is mounted. The end of the actuator arm 92 is notched as is indicated at 94 to accommodate a shoe or bar 95 pivotally supported upon a lever 102 which in turn is pivotally supported upon a shaft 97 mounted in the actuator housing 104, the shaft 97 being generally parallel to the axis of the actuator arm 92 in intermediate position thereof.

The manner in which the electrical actuator functions may perhaps be best understood from an examination of FIGURE 7 of the drawings. This figure shows diagrammatically a threaded screw 105 which is attached to a motor 106 not illustrated in this figure. The screw 105 may be rotated in either direction by the motor. A block 107 is internally threaded to engage the screw 105 and include a pair of oppositely directed pins or rollers 109. A U-shaped yoke 110 is provided with parallel ends, one of which is shown at 111 in FIGURE 7 and these ends are notched as indicated at 112 to accommodate the pins 109, one pin engaging in each notch. The yoke 110 is mounted on an arm 113 forming a part of the lever 114. The lever 114 is pivotally supported upon the shaft 97 shown only in dotted outline in FIGURE 7 in view of the fact that FIGURE 7 shows the parts in exploded form.

The lever 114 is provided with a hub 115 designed to fit about the shaft 97 and is provided with an arm 116 which is bent into substantially parallel relation to the shaft 97. The lever 116 is notched as indicated at 117 to accommodate the ends 119 and 120 of the torsion spring 121.

As the threaden member 105 rotates in one direction, the block 107 is moved upwardly thereupon and the pins 109 engage the arms 110 of the yoke and pivot the lever 114 in a clockwise direction as viewed in FIGURE 7. As considerable force is required to move the clutch collar 20, the spring 121 is pretensioned so that the pivotal movement of the lever 114 is transmitted through this spring to the lever 102, to move it in a clockwise direction. In the event the teeth of the clutch sleeve 20 do not align with the cooperable teeth 35, this misalignment will prevent complete movement of the shifting fork 63, and of the lever 102. The actuating lever will continue to rotate until the cross head block 107 reaches its extreme position, further winding the spring 121. Upon slight rotation of the drive shaft 10, the teeth will become aligned, and the spring will snap the sleeve 20 into fully engaged position.

A similar action takes place when the threaded member 105 is operated in the opposite direction. Pivotal movement of the lever 114 will be transmitted through the spring 121 to the lever 102, which acts through the shifting fork 63 to move the collar 20 to its opposite extreme position. If prevented from completing movement by misalignment of the teeth of clutch collar with the gear teeth 32, the spring will wind further until the teeth are aligned, and will then complete movement of the clutch sleeve automatically.

In accordance with the patent statutes, we have described the principles of construction and operation of our improvement in electric shift units for centrifugal pumps, and while we have endeavored to set forth the best embodiment thereof, we desire to have it understood that changes may be made within the scope of the following claims without departing from the spirit of our invention.

We claim:
1. An electric shift for shifting a clutch between two extreme positions, the shift including a support, a shifting fork, a pivot shaft connecting said fork to said support, a lever secured to said pivot shaft for movement therewith, a second lever pivotally supported intermediate its ends by said support, a swivel connection pivotally connected to one end of said second lever, said swivel connection having an aperture therein, a rod pivotally connected to said first lever, said rod passing through said aperture in said swivel connection and being releasably connected to said swivel connection, an electric actuator connected to said second lever to pivot the same, whereby movement of said actuator acts to pivot said first lever and said shift fork, and means for releasing said swivel connection from said rod to permit manual slidable movement of said rod through said aperture in said swivel to pivot said first lever and said shift fork when said actuator is immovable.

2. The structure of claim 1 and in which said rod includes a notch and said swivel includes a detent engageable in said notch to hold said rod and swivel from relative longitudinal movement.

3. The structure of claim 2 and in which said detent may be disengaged from said notch by relative rotation of said rod and swivel.

4. An electric shift device for shifting a clutch between two extreme positions, the device including a support, a shift fork, a pivot shaft connecting said shift fork and said support, a first lever mounted on said pivot shaft and pivotal therewith, a clevis pivotally connected to said lever, a rod secured to said clevis for axial rotation relative thereto, a swivel slidably supported on said rod, a second lever pivotally supported by said support and pivotally secured to said swivel, an electrically operated actuator connected to said second lever to pivot the same and releasable means for connecting said rod and swivel to hold said swivel in fixed relation on said rod.

5. The structure of claim 4 and in which said releasable means includes cooperable parts on said rod and on said swivel which are engaged in one pivotal position of said rod in said swivel and disengaged in other pivotal positions thereof.

6. The structure of claim 4 and in which said rod includes a transverse notch and said swivel includes a detent engageable in on slidable position of said rod and in one pivotal position thereof, said notch and detent forming the releasable means connecting said rod and swivel.

7. A shift for shifting a clutch between two extreme positions, the shift including a support, a shifting fork, a pivot shaft connecting said fork to said support, a lever secured to said pivot shaft for movement therewith, a second lever pivotally supported intermediate its ends by said support, a swivel connection pivotally connected to one end of said second lever, said swivel connection having an aperture therein, a rod pivotally connected to said first lever, said rod passing through said aperture in said swivel connection so as to be rotatable with respect thereto, means releasably connecting said swivel connection to said rod, actuating means connected to said second lever to pivot the same, whereby movement of said actuating means acts to pivot said first lever and said shift fork, and means for releasing said swivel connection from said rod upon rotation of said rod to permit manual slidable movement of said rod through said aperture in said swivel to pivot said first lever and said shift fork when said actuating means is immovable.

8. The structure of claim 7 and in which said last named means comprises a notch in said rod and a detent in said swivel releasably engageable in said notch.

9. The structure of claim 8 and in which said detent is disengageable from said notch by rotation of said rod relative to said swivel.

References Cited by the Examiner
UNITED STATES PATENTS

| | | | |
|---|---|---|---|
| 1,016,052 | 1/12 | Webb | 192—83 |
| 1,290,199 | 1/19 | Holland | 192—83 |
| 1,441,112 | 1/23 | Patrick et al. | 192—82 |
| 1,708,440 | 4/29 | Carhart | 192—82 |
| 1,999,262 | 4/35 | Tenney. | |
| 2,099,768 | 11/37 | Nardone | 192—82 |

DAVID J. WILLIAMOWSKY, *Primary Examiner.*
THOMAS J. HICKEY, *Examiner.*